(12) United States Patent
Buron et al.

(10) Patent No.: US 7,792,883 B2
(45) Date of Patent: Sep. 7, 2010

(54) VIEWPORT-RELATIVE SCORING FOR LOCATION SEARCH QUERIES

(75) Inventors: Florian Michel Buron, Zurich (CH); Ramesh Balakrishnan, San Francisco, CA (US); James Christopher Norris, Mountain View, CA (US); James Robert Muller, Palo Alto, CA (US); Thai Tran, Redwood City, CA (US); Lars Eilstrup Rasmussen, Seaforth (AU)

(73) Assignee: Google Inc., Mountain View, CA (US)

( * ) Notice: Subject to any disclaimer, the term of this patent is extended or adjusted under 35 U.S.C. 154(b) by 326 days.

(21) Appl. No.: 11/953,806

(22) Filed: Dec. 10, 2007

(65) Prior Publication Data
US 2008/0154888 A1 Jun. 26, 2008

Related U.S. Application Data

(60) Provisional application No. 60/869,549, filed on Dec. 11, 2006.

(51) Int. Cl.
*G06F 17/30* (2006.01)
(52) U.S. Cl. ...................................................... 707/918
(58) Field of Classification Search ................. 707/609, 707/705, 765, 769, 802, 918
See application file for complete search history.

(56) References Cited

U.S. PATENT DOCUMENTS

| 5,265,065 | A | 11/1993 | Turtle | 395/600 |
|---|---|---|---|---|
| 5,692,176 | A | 11/1997 | Holt et al. | 395/605 |
| 6,092,076 | A * | 7/2000 | McDonough et al. | 707/102 |
| 6,321,227 | B1 * | 11/2001 | Ryu | 707/10 |
| 6,711,567 | B2 * | 3/2004 | Littlefield et al. | 707/3 |
| 2005/0065916 | A1 | 3/2005 | Ge et al. | |

FOREIGN PATENT DOCUMENTS

WO  WO 01/65410 A2  9/2001

OTHER PUBLICATIONS

International Search Report and Written Opinion for International Application No. PCT/US07/025695, mailed Jun. 10, 2008.
Delboni, T.M., et al., "Geographic Web Search Based on Positioning Expressions," Proceedings of the 2005 Workshop on Geographic Information Retrieval, Breman, Germany, 2005, pp. 61-64.

(Continued)

*Primary Examiner*—Fred I Ehichioya
(74) *Attorney, Agent, or Firm*—Morgan, Lewis & Bockius LLP

(57) ABSTRACT

A method for performing a location search includes receiving a location search query, identifying one or more geographical features that satisfy the location search query, ranking the identified geographical features in accordance with a score that is based, at least in part, on proximity of the geographical features to a geographical viewport region of a client system, to produce a set of ranked geographical features, and providing results, in accordance with the ranked documents, that identify at least one geographic feature corresponding to the at least one of the ranked geographical features.

23 Claims, 13 Drawing Sheets

OTHER PUBLICATIONS

Morimoto, Y., et al., "Extracting Spatial Knowledge from the Web," Proceedings of the 2003 Symposium on Application and the Internet, Jan. 27-31, 2003, Piscataway, New Jersey, pp. 326-333.

Markowetz et al., "Design and Implementation of a Geographic Search Engine," World Wide Web and Databases Int'l Workshop, WEBDB, Jun. 16, 2005, pp. 1-6.

Zhang, J., et al., "A GML-Based Open Architecture for Building a Geographic Information Search Engine Over the Internet," Proceedings of the $2^{nd}$ Int'l Conference on Web Information Systems Engineering, Piscataway, New Jersey, Dec. 3, 2001, pp. 25-32.

Office Action mailed Apr. 28, 2009, for related U.S. Appl. No. 11/698,583.

* cited by examiner

<CN> type=type_route </element>
<CNA> victoria street </element>
<CA> westminster </element>
<CA> london </element>
⋮
<CA> england </element>
<A> angleterre </element>
<A> united kingdom </element>
⋮
<A> verenigd koninkrijk </element>
<Cn> islington </element>
<Cn> west end </element>
⋮
<Cn> covent garden </element>

VIEWPORT-RELATIVE SCORING FOR LOCATION SEARCH QUERIES

RELATED APPLICATION

This application claims priority to U.S. provisional patent application 60/869,549, filed Dec. 11, 2006, "Viewport-Relative Scoring for Location Search Queries," which is hereby incorporated by reference in its entirety>

TECHNICAL FIELD

Search engines provide a powerful tool for locating content in documents in a large database of documents, such as the documents on the Internet or World Wide Web (WWW), and/or the documents stored on the computers of an Intranet. The documents are located using an index of documents in response to a search query, consisting of one or more words, terms, keywords and/or phrases, henceforth called terms, that are submitted by a user. Documents in the index of documents may be matched to one or more terms in the search query to determine scores. A ranked listing of relevant documents or document locations, based on the scores, is provided to the user.

Search queries may have a variety of purposes and formats. One class of formats corresponds to location searches. Conventional location searches often use a fixed format, such as a template. Existing templates are often fixed or may only allow a limited number of variations. For example, words or terms in an existing location search query may have a pre-determined order (street name, state, zip code) and/or a pre-determined spelling. As a consequence, it is difficult or impossible to accommodate a wide range of spellings, including spelling errors, alternative names for locations, and alternative address formats, such as those found in different countries.

Many existing search engines often return a single result in response to location search queries. In conjunction with the lack of format flexibility for the location search queries, this makes it difficult to accommodate an uncertainty or ambiguity in either the location search query and/or the results that are returned to a user.

The lack of flexibility in existing location search queries also often compromises search engine performance, since the existing location search queries are often processed in a single data structure. An inability to scale the data structure and distributed it throughout the search engine may lead to slower processing of location search queries. Overcoming such bottlenecks may result in additional search engine complexity and expense.

There is a need therefore, for improved formats and techniques for processing location search queries. In addition, there is also a need for improved reporting of results of location search queries to users.

SUMMARY

The above deficiencies and other problems associated with location search queries are reduced or eliminated by the disclosed embodiments of processes and search engines.

In some embodiments, a method for performing a location search includes receiving a location search query; identifying one or more geographical features that satisfy the location search query; ranking the identified geographical features in accordance with a score that is based, at least in part, on proximity of the geographical features to a geographical viewport region of a client system, to produce a set of ranked geographical features; and providing results, in accordance with the ranked documents, that identify at least one geographic feature corresponding to the at least one of the ranked geographical features.

In some embodiments, a method for performing a location search includes receiving a location search query; identifying one or more geographical feature documents that satisfy the location search query, wherein each of the geographical feature documents correspond to a geographical feature; ranking the identified documents in accordance with a score that is based, at least in part, on proximity of the geographical features corresponding to the identified documents to a geographical viewport region of a client system, to produce a set of ranked documents; and providing results, in accordance with the ranked documents, that identify at least one geographic feature corresponding to the at least one of the ranked documents.

The aforementioned methods, as well as corresponding data structures and graphical user interfaces may be included in and/or performed by a search engine system having one or more central processing units, a memory in one or more computers, and one or more programs stored in the memory and executed by the one or more central processing units.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1:
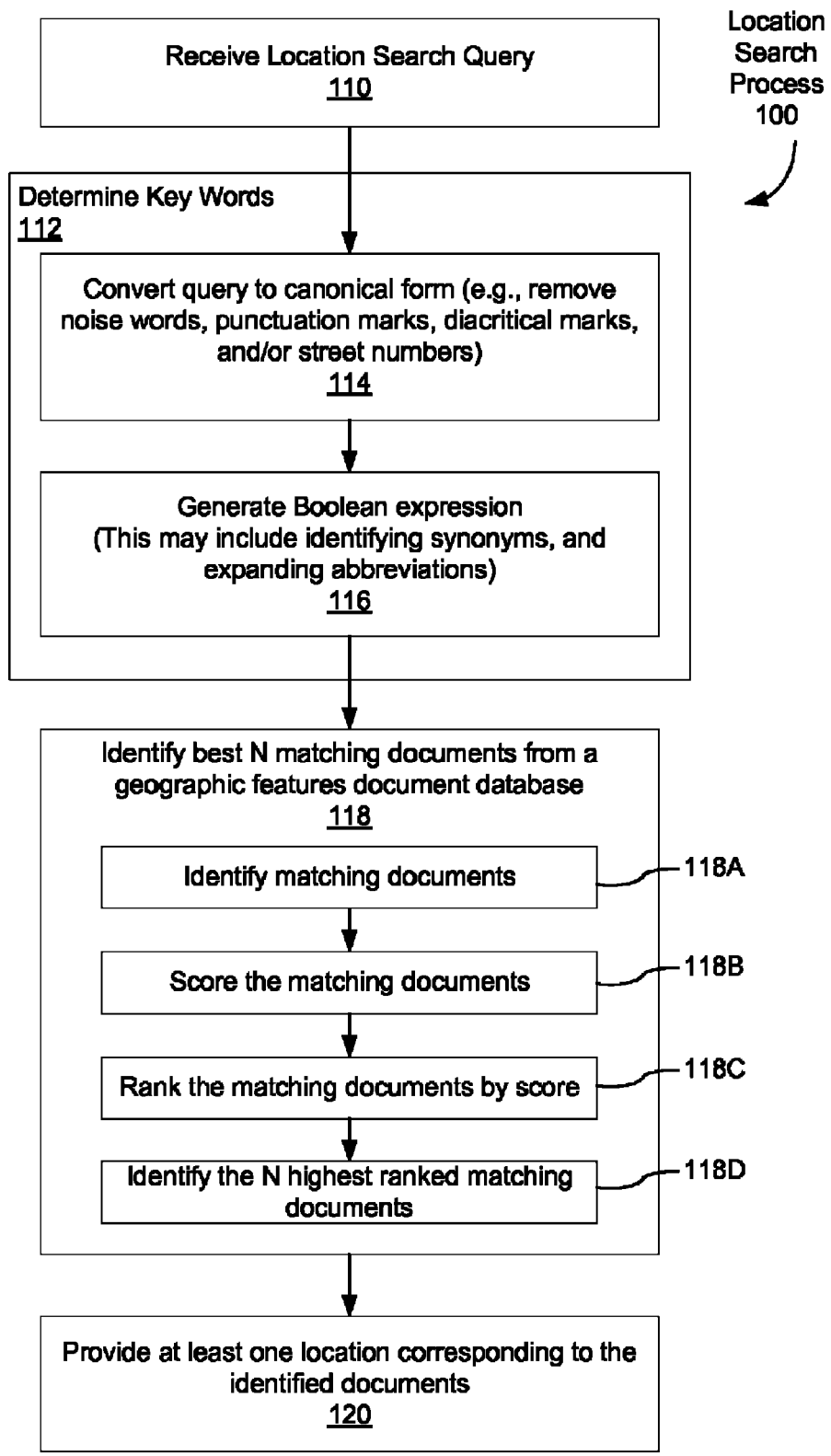
FIG. 1 is a flow diagram illustrating an embodiment of a location search process.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

Embodiments of systems and methods for performing location search queries and providing corresponding results to users are described. This processing is sometimes referred to as geocoding. Location search queries, such as a street address in a city, may be received from a user using a search engine coupled to a network, such as the Internet (also referred to as the World Wide Web or WWW) and/or one or more intranets. The location search queries are processed to determine a canonical or Boolean expression. The processing may include determining one or more key words in a respective location search query, removing punctuation marks and non-location terms (such as articles) from the respective location search query, and determining one or more synonyms for one or more terms in the respective location search query. The synonyms may include predetermined abbreviations for and/or predetermined misspellings of one or more terms in the respective location search query. The canonical expression may be independent of, i.e., insensitive to, an order of the key words.

The canonical expression may be compared to an index of geographic feature documents in a search engine. Each geographical feature document corresponds to a geographical feature, which may be a location (e.g., a street, city, country, state, country) or a geographical entity (e.g., lake, river, mountain, continent, ocean, etc.). While a single geographical feature may correspond to a set of locations, such as a set of street addresses, all the locations associated with a geographical feature may be considered to be "a location" in the context of identifying the locations or geographical features that best match a location search query. The terms "geographical feature" and "location" are used synonymously in at least some portions of this document.

The index of geographical feature documents may be distributed over multiple computers in the search engine. The index may include location information and supplemental information. The location information may include key words, synonyms for the key words, and proximate objects for multiple locations. The supplemental information may include reference coordinates, such as latitude and longitude and/or a range or street numbers, for the locations.

Scores for a subset of the geographic feature documents that are a close match to a respective canonical expression may be returned by the computers. A ranking of a top-N geographic feature document may be determined. If a best score is more than a pre-determined multiple of a next best score, the location corresponding to the best score may be provided to the user along with a map image of the corresponding location. The map image may be centered on the corresponding location and may be sized to include a pre-determined bounding box, region or window around the corresponding location. Alternatively, if the best score is less than the pre-determined multiple, several locations corresponding to a range of scores may be provided to the user. Additional information, such as a location identifier (city, state, zip code and/or country) and/or links to corresponding map images, may be provided.

The embodiments, therefore, may accommodate a wide variety of formats, allow for ambiguity in the location search query and/or in the results, and may be use parallel processing so as to provide high speed processing of location search queries (sometimes called location searching). The embodiments, therefore, may provide improved processing of location search queries.

Attention is now directed towards location search processes. FIG. 1 is a flow diagram illustrating an embodiment of a location search process 100. While the location search process 100 described below includes a number of operations that appear to occur in a specific order, it should be apparent that the process 100 can include more or fewer operations, which can be executed serially or in parallel (e.g., using parallel processors or a multi-threading environment), an order of two or more operations may be changed and/or two or more operations may be combined into a single operation.

A location search query may be received (110). Key words may be determined (112). The location search query may be converted into a canonical form (114). This may include removing one or more non-location or noise words or terms, punctuation marks, diacritical marks (i.e., a mark added to letter to indicate a special pronunciation), and/or street numbers from the location search query. A Boolean expression may be generated (116). The Boolean Expression may contain synonyms for one or more words or terms in the location search query. Converting the search query into canonical form may also include expanding one or more abbreviations, such as expanding "st." or "st" into "street". In some embodiments, a misspelled word or term in the location search query (e.g., a term the query processing process determines is likely to be misspelled) may be "corrected" by supplementing the query with a "synonym" for the misspelled word that comprises the corresponding correctly spelled word. Determining the key words (112) may make a resulting query independent of the order of the key words. N (e.g., ten) best matching geographic feature documents may be identified from a geographic features document database (118). At least one geographical feature or location corresponding to the identified documents may be provided (120).

Identifying the N best matching documents 118 requires several computational operations. First, geographical feature documents satisfying the search query are identified 118A. For example, this may be accomplished by retrieving lists of documents that match each of the query terms and then performing a Boolean AND operation on the retrieved lists to produce a list of documents (if any) that match all the query terms. In another example, the search query is first "rewritten," by removing any non-location terms and any punctuation, prior to identifying documents that satisfy the search query. Optionally, a respective individual term in the search query can be replaced by a Boolean OR expression that includes the term and one or more synonyms. In some embodiments, synonyms are added to the search query for each term in the query for which a set of synonyms has been predefined. Optionally, other modifications can be made to the search query in accordance with predefined rules so as to improve the quality of the search results.

Next, scores are computed for the identified matching documents 118B. Exemplary processes for generating the score for each matching document are discussed in some detail below. Generally, though, documents with high quality matches to the search query are assigned higher scores than documents with lower quality matches to the search query. Other factors, such as the locations of the geographical features corresponding to the matching documents, relative to a current viewport in which a map or image is displayed, and the relative importance of these geographical features, may also be factors in computing the scores. The matching documents are then ranked based on the computed scores 118C, and the N highest ranked documents are identified 118D. In some embodiments, the ranking of the documents and the selection of the N highest ranked documents is combined into a single operation (e.g., by running a top N filter over the scores). In some embodiments, documents having lower rank than the top N documents are not ranked.

Figure 2:
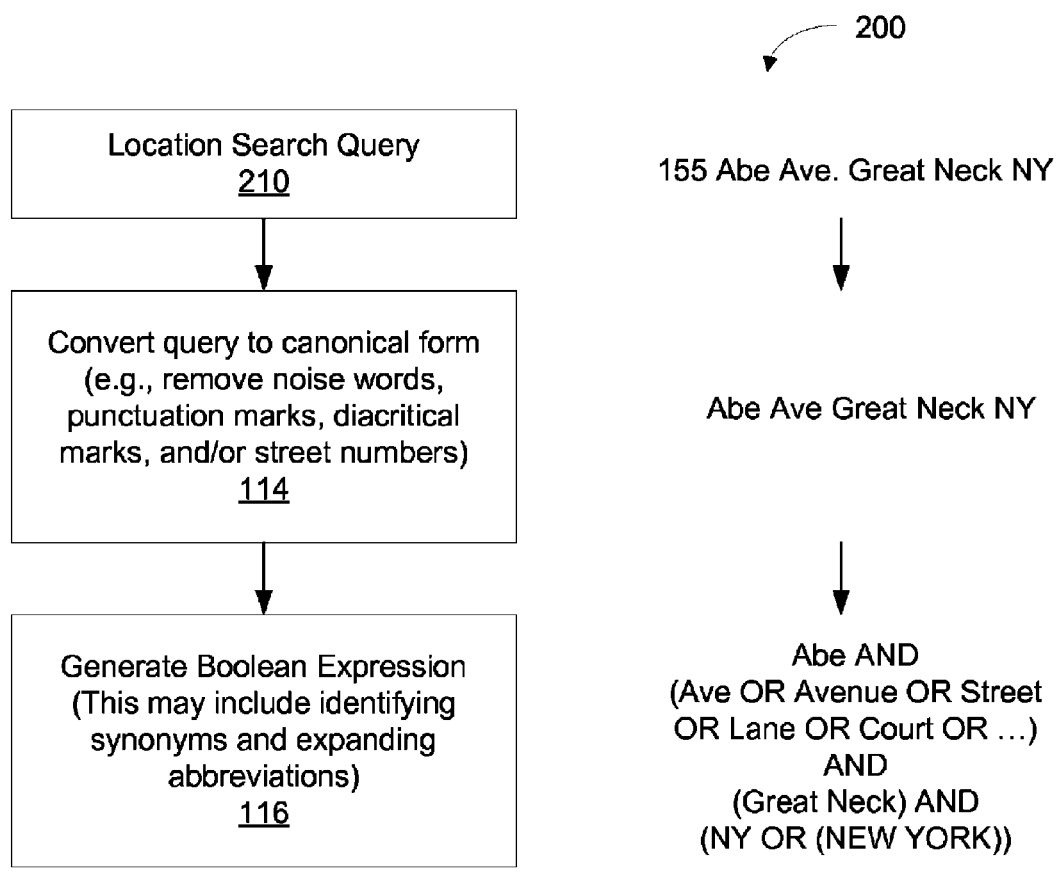
FIG. 2 is a block diagram illustrating an embodiment of processing a location search query.

FIG. 2 is a block diagram illustrating an embodiment 200 of processing a location search query. A location search query 210, such as "155 Abe Ave. Great Neck N.Y.", is used as an illustrative example. The street number 155 and the period may be removed during operation 114 resulting in Abe Ave Great Neck N.Y. In operation 116, the location search query may be converted into a Boolean expression, including expanding abbreviations (such as Ave) and synonyms. The resulting Boolean expression is Abe AND (Ave OR Avenue OR Street OR Lane OR Court OR . . . ) AND (Great Neck) AND (NY OR (NEW YORK)). This Boolean expression is independent of, i.e., insensitive to, an original word or term order in the location search query 210. As such, it may accommodate a wide variety of formats for the location search query 210. Such a Boolean expression has a form that may be processed in a search engine using a distributed geographic feature document database. This is discussed further below.

Figure 3:
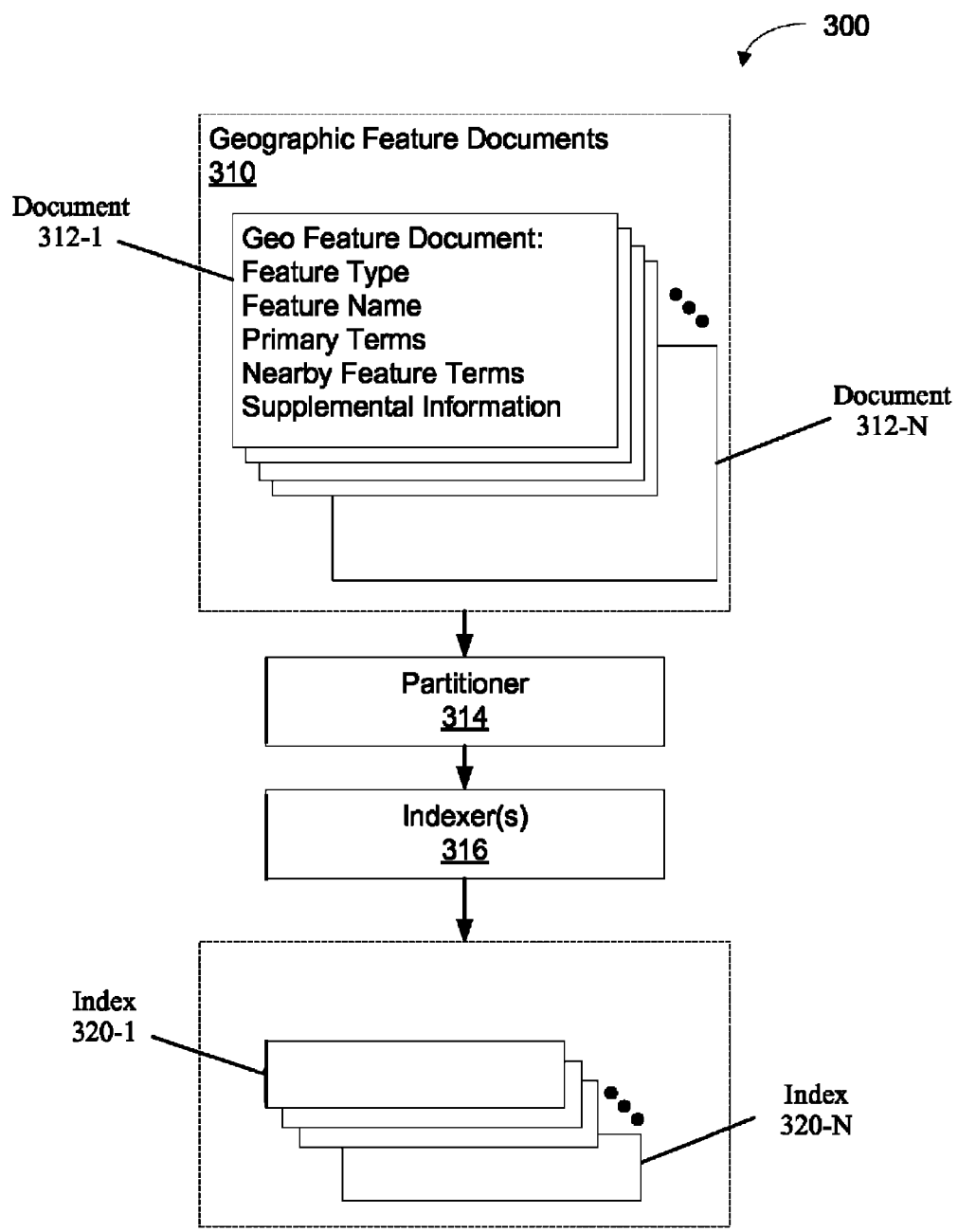
FIG. 3 is a block diagram illustrating an embodiment of distributing geographic feature documents over a plurality of indexes.

Attention is now directed towards embodiments of the geographic feature document database. FIG. 3 is a block diagram illustrating an embodiment 300 of distributing geographic feature documents over a plurality of indexes, which may be stored on multiple computers in a search engine. Geographic features documents 310 may include a plurality of geographic feature documents 312. A respective geographic feature document, such as document 312-1, may include a feature type (such as a street, road, route, city, country, intersection, etc.), a feature name (i.e., the name of a location), primary terms (such as specific key words associated with the feature), nearby feature terms (such as adjacent or proximate landmarks or locations of interest) and supplemental information (such as latitude and longitude of the feature). The supplemental information may be used by a map or tile server to present a map image(s) corresponding to the location in the respective geographic feature document. This is described further below with reference to FIGS. 5 and 7.

A partitioner 314 may distribute subsets of the geographic feature documents 310 via one or more indexers 316 to a respective index, such as index 320-1, in a plurality of indexes 320. The index 320-1 may correspond to one partition or sub-partition of the indexes 320 (which may collectively be considered to be the inverse index of the entire geographic feature documents database). The indexes 320 may be stored on one or more computers in the search engine. The subsets may be distributed such each index 320 handles an equivalent or approximately equivalent portion of processing associated with the respective location search query. For example, the documents 312-1 may be distributed randomly or pseudo-randomly over the indexes 320. For instance, a hash function and modulo function may be used to distribute the geographic feature documents to M indexers, were M is the number of indexes (sometimes called index partitions or index sub-partitions). In this example, a hash function is applied to each geographic feature document (or to a predefined portion of the document) to produce a hash value, and then a "modulo M" function is applied to the hash value to produce a selection value between 0 and M−1. The selection value determines which of the M indexers 316 is to receive the document for indexing.

Figure 7:
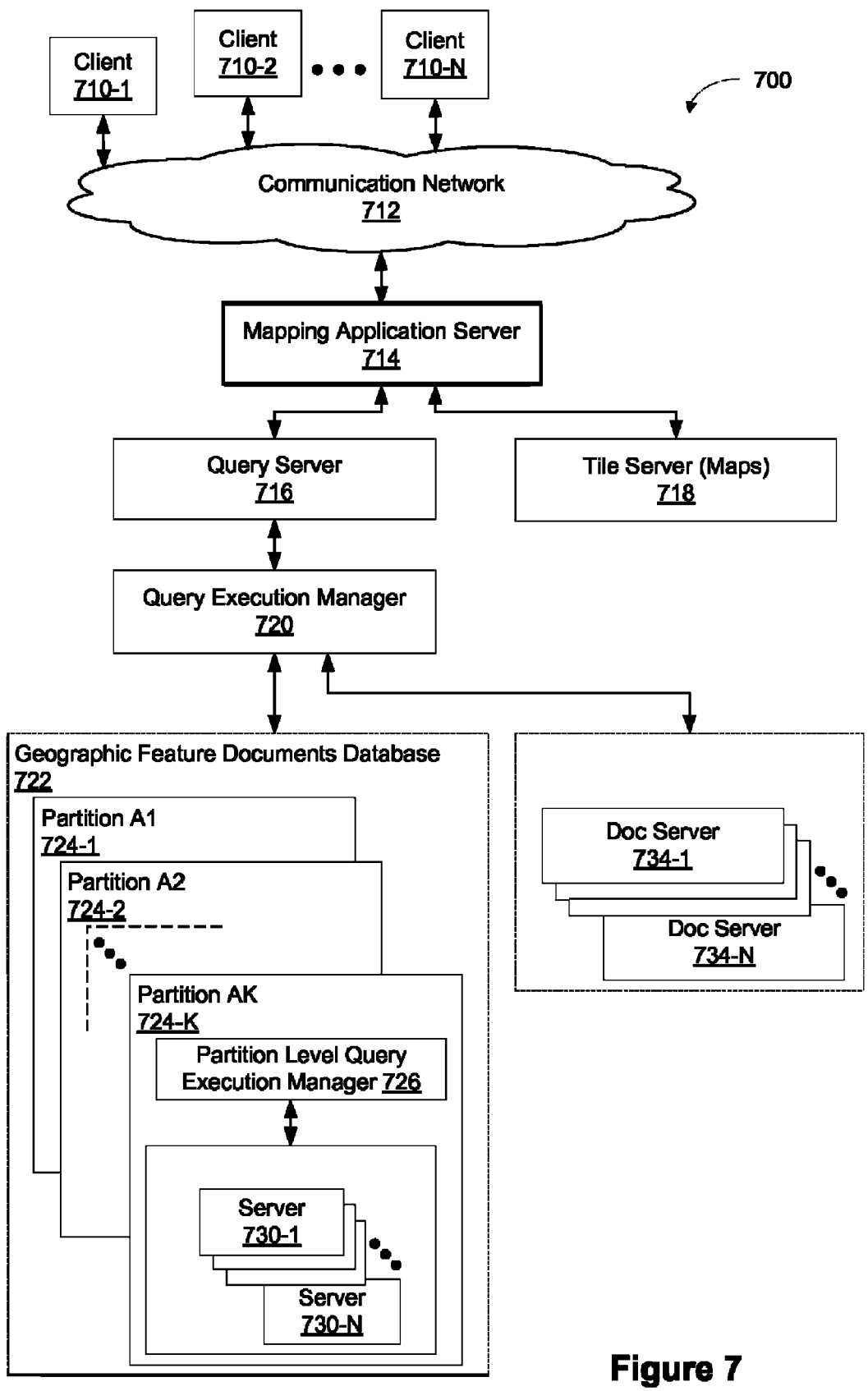
FIG. 7 is a block diagram illustrating an embodiment of a search engine system.

When processing the respective search query, each of the indexes 320 may provide a top-N (such as a top-10) set of documents in the subset of documents that match the respective query. As discussed further below, the top-N documents may be based on a ranking of scores. In particular, a score may be determined for each document that matches the search query. The score may be based on the canonical and/or Boolean expression for the respective location search query. Referring to FIG. 7, the query processing for each sub-partition of the index 320 is handled by a respective server 730, which returns information identifying up to N of the highest ranking documents that match the query. A server 726 that may be called an aggregator or partition level query execution manager combines the search results from the servers 730, for example by selecting the N best search results from among the results returned by the servers 730. At a next higher level in the hierarchy, query execution manager 720, the search results from all the aggregators 726 are combined, by selecting the N best search results from among the results returned by the aggregators 720. More generally, a predefined number of best search results are selected at each level in a distributed hierarchy and are passed on to the next level. For example, if 10 sets of top-10 documents are received at a given level, the top-10 documents may be determined and passed on. In this way, the top-N documents in the documents 312 may be determined and/or identified using a distributed implementation. This approach may improve performance of the search engine and may reduce system cost and/or complexity.

Figure 4:
FIG. 4 is a block diagram illustrating an embodiment of a geographic feature document.

FIG. 4 is a block diagram illustrating an embodiment of a geographic feature document 400, such as the document 312-1. The document 400 may be compatible with hypertext markup language (HTML) and/or extensible markup language (XML). The document 400 may include information corresponding to a geographic feature, such as a location (e.g., a street, intersection, city, point of interest, etc.). Some documents 400 may include information for more than one location (e.g., multiple segments of a street, city, or the like). Such location information may include key words corresponding to the one or more locations, one or more regions associated with the one or more locations and synonyms for one or more of the key words.

As shown in the embodiment 400, text following an HTML tag <CN> may indicate a type of location, in this case a route. Text following an HTML tag <CNA> may indicate an explicit name for the location, in this case Victoria Street. Text following HTML tags <CA> may indicate key words corresponding to the location, such as Westminster, London and England. Text following HTML tags <A> may indicate synonyms for the key words and/or the explicit name for the location, such as Angleterre, United Kingdom and Verenigd Koninkrijk. The synonyms may include words from foreign languages (i.e., languages other than the language of the key words). In some embodiments, the synonyms may include abbreviations and/or common misspellings in one or more keywords and/or in the explicit name for the location. Text following HTML tags <Cn> may indicate other locations or regions that are nearby or that neighbor the location. In this example, the nearby locations or regions are Islington, West End and Covent Garden.

The tagged text or information items in a document 400 may be called information items or text items. The information items or text items are processed by the indexers 316 (FIG. 3) to produce the indexes 320.

The document 400 may include less information or additional information, including fewer or additional tags. For example, the document 400 may include supplemental information, such as reference coordinates corresponding to the geographic features, that may be used by a map or tile server. In an exemplary embodiment, the reference coordinates may include latitudes and longitudes for one or more locations and/or a range of street numbers that bracket one or more locations. In other embodiments, an order of the information in the document 400 may be changed. Two or more items in the document 400 may be combined into a single item.

One specific example of supplemental information in a document 400 is the supplemental information for street or other route. In this example, the supplemental information includes one or more segments, each corresponding to a portion of the street or route. Each segments specifies a beginning and ending street number corresponding to first and second ends of the segment, and also specifies a latitude and longitude for each end of the segment. When a location search query that includes a street number matches the document 400, the specified street number is used to identify the best matching segment in the document's supplemental information. If the specified street number falls between the beginning and ending street numbers for the best matching segment, linear interpolation is used to determine a latitude and longitude for the location specified by the location search query. Alternately, if the specified street number matches the beginning or ending street number for the best matching segment, then the corresponding latitude and longitude are used for the location of the location specified by the location search query.

As mentioned previously, when comparing a canonical and/or Boolean expression corresponding to the respective location search query to documents 312 (FIG. 3) in the geographic feature documents 310 (FIG. 3) scores indicative of a degree of matching may be determined. These scores may indicate a relevancy of the documents 212, and thus, the corresponding locations, to the location search query. As such, the scores may be used by the search engine to determine a best result, i.e., a best location, or a list of the top-N results, i.e., the top-N locations, in response to the location search query.

In some embodiments, scores may only be determined for a subset of the documents 312 (FIG. 3), i.e., the search engine may determine a candidate set of documents that may correspond to the location search query. In an exemplary embodiment, criteria for inclusion in the candidate set of documents may include a requirement that at least one of the key words match the explicit name of the feature (the text following the <CNA> tag in FIG. 4) and that each of the elements or terms in the canonical and/or Boolean expression occurs in a document.

In an exemplary embodiment, the scores may be determined using $$\frac{1}{E}\left[\sum_i IR_i\right] \times FR \times Q,$$

where $IR_i$ is a query match score (with respect to a particular candidate document) corresponding to a respective term or element "i" in the canonical and/or Boolean expression, FR is "feature rank" that indicates an importance of the feature or location, E is a normalization value, and Q is an optional factor. Q may correspond to the quality of the match between the query and the candidate document, or it may correspond to any other metric that may be used to improve the quality of the search results. An example of the Q factor is described below with reference to FIGS. 11-15. In other embodiments, Q is not used, or equivalently is set equal to 1.

In some embodiments, the normalization value, E, is the maximum value of the sum of the $IR_i$ scores for a perfect match, or equivalently the sum of the token masses for the key words in the search query. The sum of the $IR_i$ values may be called the total match score or IR score for the candidate document. The value of $IR_i$ for a particular key word in the search query may include a product of weights. The weights may include a token mass, a relevance score and an element mass for the corresponding element or term in the canonical and/or Boolean expression. The token mass may correspond to a type of term, where the types of terms may include stop words, street affix key words (e.g., a street prefix word such as "rue" in French, or street suffix words such as "street," "avenue," "road," and "place" in English), numbers, synonyms, and other key words, with each predefined type of term being assigned a predefined token mass. The predefined token mass values may have a predefined range, such as 0 to 1, or 0 to 8, or the like. In some embodiments, the default token mass (for "other key words") is 1, while token types such as synonyms, and street affix key words and stop words are all assigned lower token mass values. In some embodiments synonyms are assigned a larger token mass than street affix words.

The relevance score may vary based on the degree of text match, with a predefined largest value for a complete text match between a query key word and an information element of the document. When the best match of a query key word with the information elements of a document is only a partial match (e.g., the query key word matches only one word of a multiword element), the relevance score is less than the predefined largest value, and reflects the degree of text match.

The element mass may vary as a function of a size or type of the geographic feature associated with an information item (in the candidate document) that matches a query key word. For example, an information item that is country name may be given a higher element mass than an information item that is a locality name (such as a city name), which in turn is given a higher value than an information item that is a street name. The element mass may also reflect the type of information item that matches the query key word. For example, the information item that contains the explicit name for the geographical feature may be assigned a highest element mass, an information item that is a "context" item (e.g., the city or country in which a street is located) may be assigned a next highest element mass, and an information item that contains the name of a nearby city, region or other geographical feature may be assigned a lowest element mass. In some embodiments, the element mass for an information item in a candidate document is equal to the product of two element mass factors, one of which is based on the size or type of the geographical feature named by the information item and the second of which is based on the type of information item (explicit name, context, or nearby feature) that matches the query key word. In some other embodiments, the element mass for an information item in a candidate document is equal to the sum of these two element mass factors.

The feature rank, FR, for a candidate document may be based on a document frequency (a number of times a feature is referenced in the documents 312 in the database 310, FIG. 3), or it may be based on the size of a geographic feature, with bigger features (i.e., geographic extent) given higher feature rank values. In other embodiments, the feature rank can be based, at least in part, on the importance or popularity of the geographic feature corresponding to the candidate document. For example, the importance or popularity of the geographic feature corresponding to a candidate document may be determined by a world-wide-web search or other database search on the name of the geographic feature.

When a query key word has one or more synonyms, an IR score is computed (with respect to a candidate document) for each of the synonyms and for the query key word, and then the best of those IR scores is selected and used when computing the combined IR score for the candidate document.

In some embodiments, the scoring function shown above is modified so as to increase the importance of one or more factors relative to the other factors. For example, the scoring function may be changed to $$\left(\frac{1}{E}\left[\sum_i IR_i\right]\right)^M \times FR \times Q,$$

where the exponent, M, is a value greater than one (e.g., 2, 2.5 or 3), and is typically between two and five ($2 \leq M \leq 5$), so as give the normalized total match score more importance in the scoring function than the feature rank, FR, and Q factors. In some embodiments, the scoring function discussed above is modified to favor documents whose name has terms in the same order as the terms are positioned in the search query over documents matching the same terms, but which have the terms in a different order in their name. For example, the total match score may be supplemented with a pair-wise matching score (e.g., total match score+pair-wise match score), which is based on the number of ordered term pairs (ordered, neighboring terms) in the search query that match ordered terms pairs in the document name.

Figure 5A:
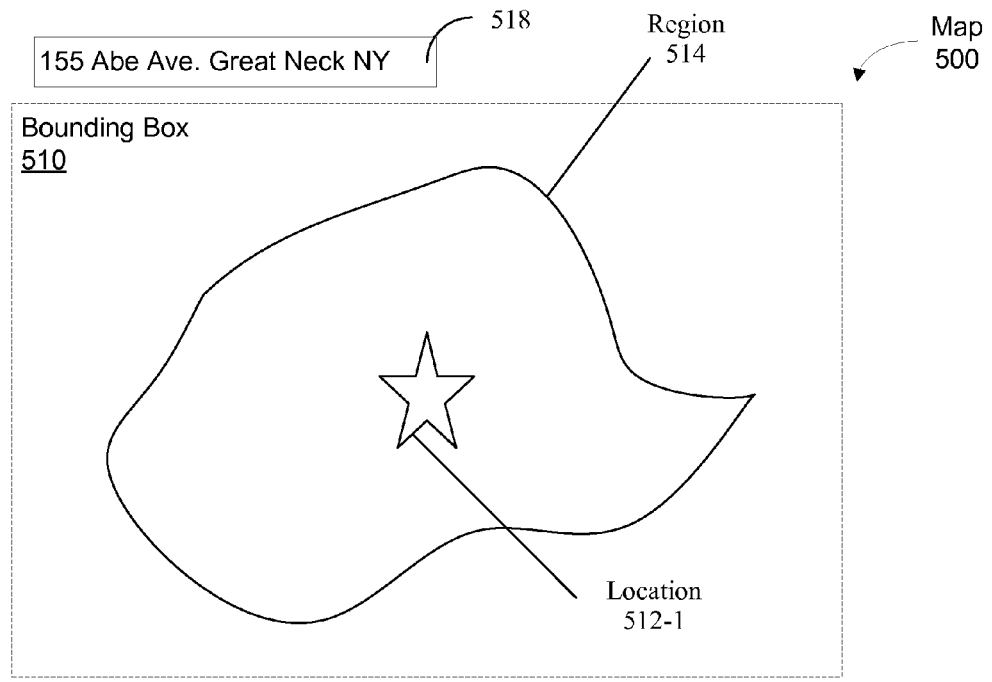
FIG. 5A is a block diagram illustrating an embodiment of a map image.

Attention is now directed towards embodiments of a process for providing one or more location results to the user in response to the location search query. If a best score for a first document is greater than a pre-determined multiple of a next best score for a second document in a top-N ranking (for example, the next best score is less than 70% of the best score), the location corresponding to the first document may be provided to the user. Using the supplemental information stored with the document, a map or tile server may provide a map image of a region centered on the location to the user. For example, if the supplemental information includes street addresses bracketing the location, the center of the map image may be determined using linear interpolation. FIG. 5A is a block diagram illustrating an embodiment of a map image 500 provided to the user. A location tag 512-1 corresponding to the location is centered in a bounding box 510. The bounding box 510 is sized such that a region 514 surrounding the location may be provided. The size of the bounding box 510 may be determined based on the size of the geographic feature or location. Different sized features (such as cities or countries) may have different sized bounding boxes.

Figure 5B:
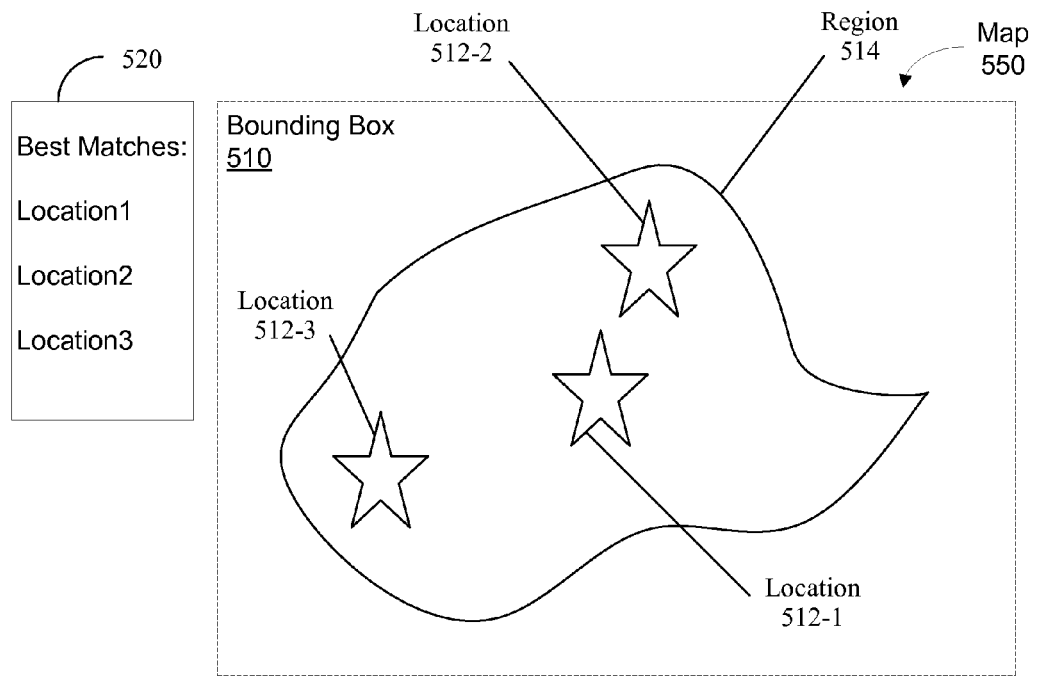
FIG. 5B is a block diagram illustrating an embodiment of a map image.

In some cases, more than one distinct location (i.e., spatially separated from one another) in a region may have the same or almost the same score. For example, more than one location may match all of the key words in the canonical and/or Boolean expression corresponding to the location search query. In such cases, these results may be provided to the user. This is illustrated in FIG. 5B, which is a block diagram illustrating an embodiment of a map image 550. A bounding box 510 is defined which includes all the locations that meet predefined selection criteria. Location tags 512 corresponding to the distinct locations are included in the bounding box 510. In some embodiments, the tags are links. By clicking on one of the tags, the user may select the corresponding location. This location may be presented to the user along with a map image, such as the map image 500 (FIG. 5A). In some other embodiments, a list 520 of the best matching locations is listed next to the map 550. Each item in the list may include a link to a map corresponding to that location. Each item in the list 520 may be represented by the canonical name (identified by a CNA tag in the example in FIG. 4) and the context text (identified by the CA tags in the example in FIG. 4) from the corresponding geographical feature document.

Figure 6:
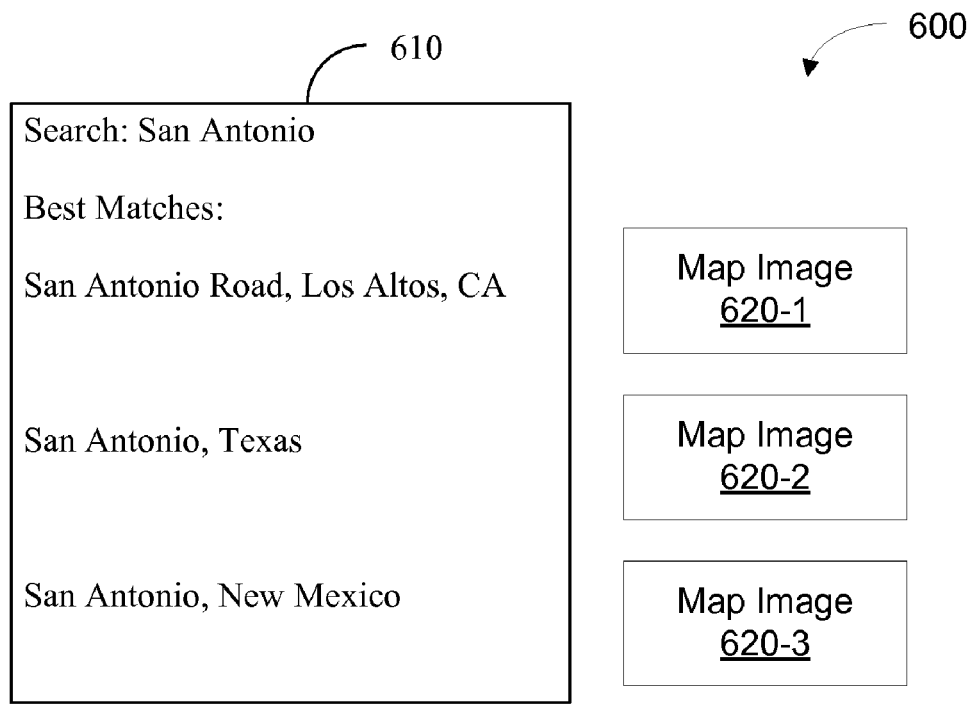
FIG. 6 is a block diagram illustrating an embodiment of results that are returned in response to a location search query.

If the best score is not greater than the pre-determined multiple of the next best score, locations corresponding to a range in the top-N ranking may be provided. For example, locations (from among the top N results) having scores greater than or equal to 50% of the best score may be provided. A variety of information may be provided along with the locations. An exemplary graphical user interface for showing multiple search results returned in response to a location search query is shown in FIG. 6. In one region 610 or column, the best matching geographic features or locations are listed, and in another region of the graphical user interface are shown individual small maps 620, one for each of the best matching geographic features or locations listed in region 610. In this example, the location search query was "San Antonio," which produced several possible relevant answers. The answers may be provided with one or more location identifiers, such as a city, a state, a zip code, and/or a country. In some embodiments, the small maps 620 each include a link to a corresponding, larger map. Similarly, in some embodiments, each of the listed best matching locations in region 610 include a link to a corresponding larger map. Clicking on one of the answers or small maps may allow the location to presented to the user along with a map image, such as the map image 500 (FIG. 5A).

Figure 9:
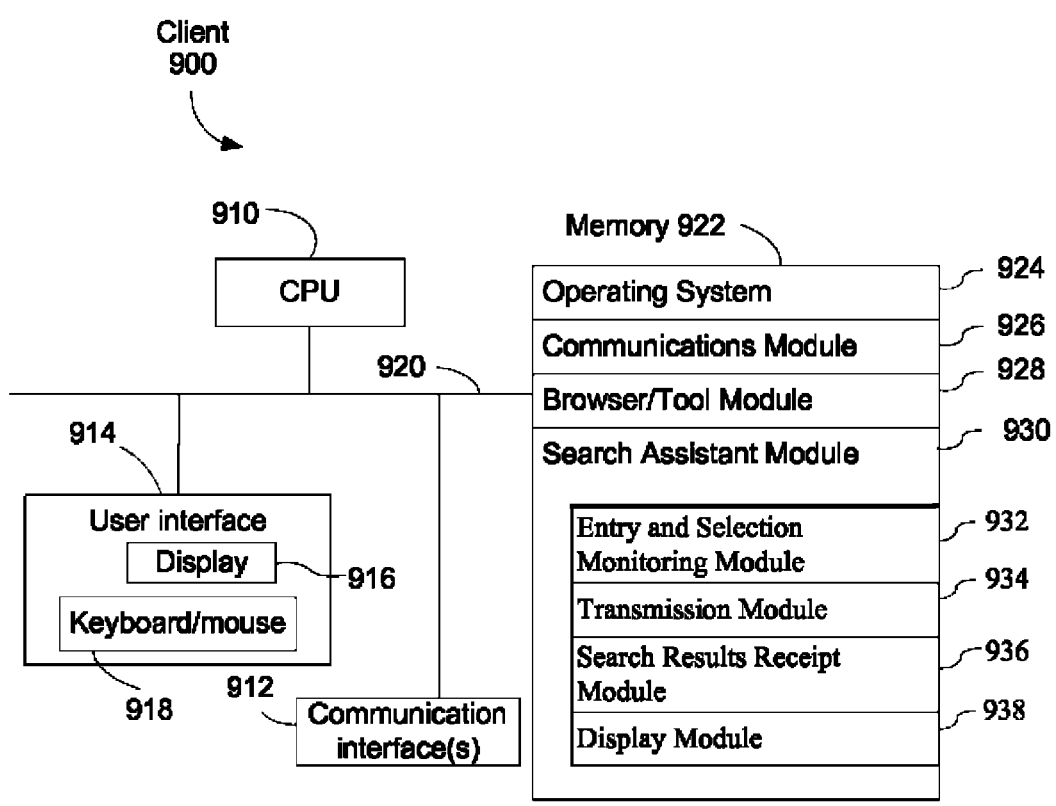
FIG. 9 is a block diagram illustrating an embodiment of a client computer.

Attention is now directed towards embodiments of search engines, client computers and data structures for implementing the previously described method, geographic feature documents and graphic user interfaces. FIG. 7 is a block diagram illustrating an embodiment of a search engine system 700 that generates location search query results in response to location search queries received from one or more clients 710, such as client system or device 900 (FIG. 9). Each client 710 may have a search assistant, such as search assistant module 930 (FIG. 9). It should be appreciated that the layout of the search engine system 700 as shown in FIG. 7 is merely exemplary and may take on any other suitable layouts or configurations. The search engine system 700, therefore, may include fewer or additional components or modules, may be implemented in hardware and/or in software, and a location or one or more components or modules may be changed. The search engine system 700 is used to search an index of documents, such as the geographic feature documents 310 (FIG. 3).

The search engine system 700 may include a mapping application server 714 that communicates with the client computers 710 using a communication network 712. The communication network 712 may be the Internet and/or an intranet. The mapping application server 714 may forward location search queries to query server 716 and receive location results from the query server 716. The mapping application server 714 may use the supplemental information in the locations results to access appropriate map images from tile server 718 and to provide such map images along with the location results to the client computers 710.

The query server 716 may determine the key words in the location search query, including converting the location search query to canonical form and/or generating a Boolean expression. The canonical and/or Boolean expression may be forwarded to query execution manager 720 for processing. The query execution manager 720 may provide the canonical and/or Boolean expression to multiple partitions 724 in geographic features documents database 722. In each partition 724, such as partition 724-K, a partition level query execution manager 726 may distribute the canonical and/or Boolean expression to servers 730 for one partition. The servers 730 may store the indexes 320 (FIG. 3). As discussed previously, the servers in the geographic features documents database 722 may determine the top-N documents corresponding to the location search query in a hierarchical fashion.

Upon receiving the top-N documents, the query execution manager 720 may access corresponding geographic or location information, such as the supplemental information, in document servers 734. In some embodiments, the geographic or location information may be included in the geographic features documents database 722.

Elements in the search engine system 700, such as the query server 716, may be dispersed over a group of servers so as to provide very fast processing of location search queries. In some embodiments, the system 700 may include replicas of the query server, query execution manager, tile server and geographic features documents database at multiple locations, in a plurality of datacenters (e.g., located on different continents, and/or at different locations within one or more countries). Location search queries submitted by users at one of the clients 710 to the search engine system 700 are routed to an appropriate datacenter using the Domain Name System (DNS), based on current load, geographic locality and/or the operational status of each of the datacenters.

Each backend preferably includes multiple query servers, such as query server 716, coupled to a communications network 712. The communications network 712 may be the Internet, but may also be any local area network (LAN) and/or wide area network (WAN). In some embodiments, each query server 716 is a server that receives location search query requests and delivers search location results in the form of web pages via HTTP, XML or similar protocols. Alternatively, if the query server 716 is used within a LAN, i.e., internally and not by the public, it may be an Intranet server. The query servers, such as query server 716, are configured to control the search process, including searching a document index, analyzing and formatting the search results. In some embodiments, a backend includes multiple query execution managers 720, coupled to the multiple query servers, such as the query server 716.

Figure 8:
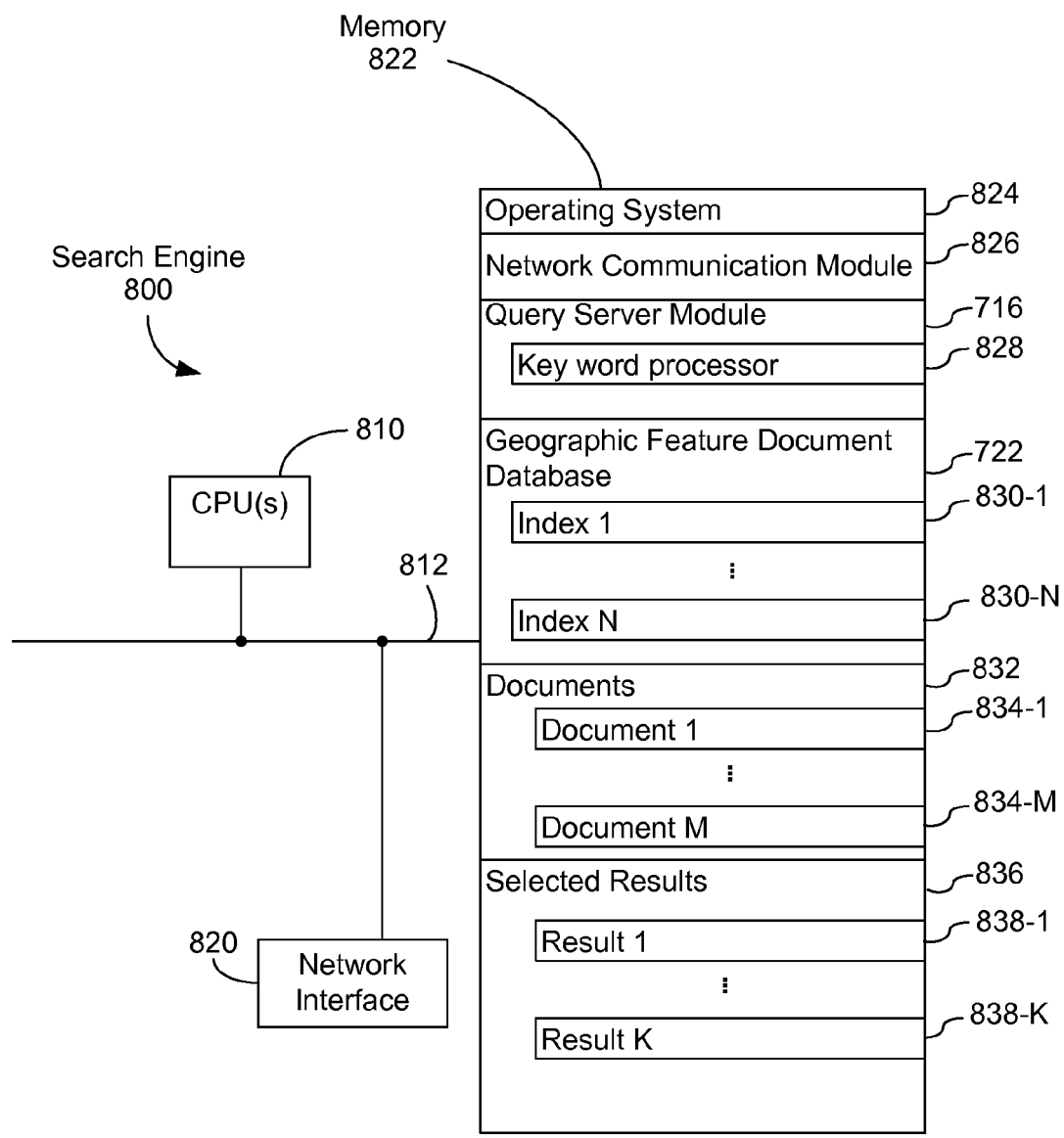
FIG. 8 is a block diagram illustrating an embodiment of a search engine.

FIG. 8 is a block diagram illustrating an embodiment of a search engine 800. The search engine 800 may include at least one data processor or central processing unit (CPU) 810, a communications or network interface 820 for communicating with other computers, servers and/or clients, memory 822 and one or more signal lines 812 for coupling these components to one another. The one or more signal lines 812 may constitute one or more communications buses.

Memory 822 may include high-speed random access memory and/or non-volatile memory, such as one or more magnetic disk storage devices. Memory 822 may store an operating system (or a set of instructions) 824, such as LINUX, UNIX or WINDOWS, that includes procedures for handling basic system services and for performing hardware dependent tasks. Memory 822 may also store communication procedures (or a set of instructions) in a network communication module 826. The communication procedures are used for communicating with clients, such as the clients 710 (FIG. 7), and with other servers and computers in the search engine system 700 (FIG. 7).

Memory 822 may also store a query server module (or a set of instructions) corresponding to the query server 716 (FIG. 7), geographic feature document database 722, documents 832 and selected results 836. The geographic feature document database 722 may include multiple indexes 830. The documents 832 may include multiple documents 834 that include geographic or location information. The selected results 836 may include results 838 to one or more location search queries.

Although FIG. 8 (like FIG. 7) shows search engine 800 as a number of discrete items, FIG. 8 is intended more as a functional description of the various features which may be present in a search engine system rather than as a structural schematic of the embodiments described herein. In practice, and as recognized by those of ordinary skill in the art, the functions of the search engine 800 may be distributed over a large number of servers or computers, with various groups of the servers performing particular subsets of those functions. Items shown separately in FIG. 8 could be combined and some items could be separated. For example, some items shown separately in FIG. 8 could be implemented on single servers and single items could be implemented by one or more servers. The actual number of servers in a search engine system and how features are allocated among them will vary from one implementation to another, and may depend in part on the amount of information stored by the system and/or the amount data traffic that the system must handle during peak usage periods as well as during average usage periods.

FIG. 9 is a block diagram illustrating an embodiment of a client computer 900. The client computer 900 generally includes one or more processing units (CPU's) 910, a user interface 914, one or more network or other communications interfaces 912, memory 922, and one or more communication buses 920 for coupling these components. The user interface 914 may include one or more keyboards 918, one or more displays 916, and/or one or more pointers (not shown), such as a mouse. Memory 922 may include random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The communication buses 920 may include circuitry (sometimes called a chipset) that interconnects and controls communications between system components. Memory 922 may include mass storage that is remotely located from the central processing unit(s) 910.

In some embodiments, memory 922 may include an operating system (or a set of instructions) 924, a network communications module (or a set of instructions) 926, a browser/tool module 928 and/or a search assistant module (or a set of instructions) 930. The search assistant module 930 may include an entry and selection monitoring module (or a set of instructions) 932, a transmission module (or a set of instructions) 934, a search results receipt module (or a set of instructions) 936 and/or a display module (or a set of instructions) 936.

The operating system 924, such as LINUX, UNIX or WINDOWS, may include procedures (or sets of instructions) for handling various basic system services and for performing hardware dependent tasks. The network communication module 926 may be used to connect the client system 900 to other computers (e.g., other client computers and/or a search engine) via the one or more communication network interfaces 912 and one or more communication networks, such as the Internet, other wide area networks, local area networks, metropolitan area networks, and so on.

The browser/tool module 928 may be a web browser that a user of the client system 900 may use to communicate and/or exchange information with one or more hosts (such as one or more websites and/or web pages) on the one or more communication networks. For example, the user may surf the Internet (e.g., display a web page and/or a web site) using the browser/tool module 928.

The search assistant module 930 (e.g., a browser extension, a browser toolbar, or instructions embedded in a search engine web page) may be used by the user to perform one or more search queries, such as location search queries, using a search engine and to receive corresponding search results, including one or more locations, one or more map images, one or more URLs and/or hyperlinks. In particular, the entry and selection monitoring module 932 may monitor user input, the transmission module 934 may send a search query to the search engine, the search results receipt module 936 may receive the search results from the search engine, and the display module 938 may display the search results (or may assist in rendering the search results for display by the browser module 928), such as a ranking of the one or more documents and/or document locations that contain identified content corresponding to the search query. The user may access or select one or more of the documents and/or document locations in the search results using the user interface 914 and the browser/tool module 928. For example, the user may click on a hyperlink using the pointer (not shown).

In embodiments where the client system 900 is coupled to a local server computer, one or more of the modules and/or applications in memory 922 may be stored in the server computer, which is typically at a different location than the client system 900. Each of the above identified modules and applications corresponds to a set of instructions for performing one or more functions described above. These modules (i.e., sets of instructions) need not be implemented as separate software programs, procedures or modules. The various modules and sub-modules may be rearranged and/or combined. Memory 922 may include additional modules and/or sub-modules, or fewer modules and/or sub-modules. For example, the search assistant module 930 may be integrated into the browser/tool module 928. Memory 922 may, therefore, include a subset or a superset of the above identified modules and/or sub-modules.

Figure 10:
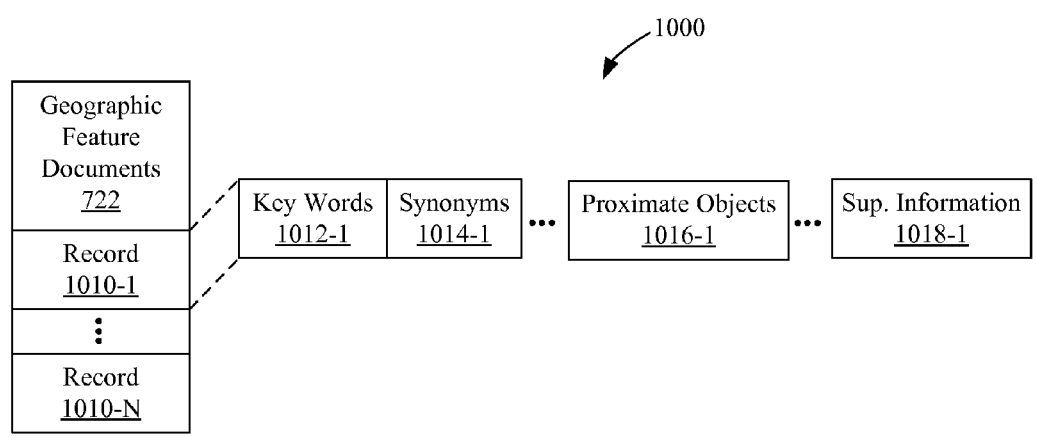
FIG. 10 is a block diagram illustrating an embodiment of a geographic features document data structure.

FIG. 10 is a block diagram illustrating an embodiment of a geographic feature document data structure 1000. The geographic feature documents data structure 1000 may include geographic feature documents 722. The geographic feature documents 722 may include multiple records 1010 that are distributed over multiple partitions on multiple computers. Each record 1010 may correspond to a respective geographic feature document. As explained above, the geographic feature documents may correspond to geographic features or locations. The records may include key words 1012, synonyms 1014 for one or more key words, associated words 1016 (such as a city where the location occurs) and/or proximate objects 1018. The geographic feature documents data structure 1000 may include fewer or additional elements, two or more elements may be combined and positions of one or more elements may be changed. For example, a respective record 1010 may further include the supplemental information 1018, including latitude and longitude information for one or more locations or bounding boxes associated with the geographic feature represented by the record 1010.

Viewport-Relative Scoring of Results from Location Search Queries

When a user performs a series of location searches, for example using an online mapping program or service, the user is often searching for geographic features (e.g., cities, streets, specific addresses, or the like) that are nearby the geographic feature(s) found in the immediately prior location search. For example, after searching for a first geographic feature in a particular city, the user will often search for a second geographic feature that is either in the same city, or in a neighboring or nearby city. For ease of discussion, geographic features are sometimes called "locations," but it should be understood that some geographic features, such as a street (as opposed to a specific street address), correspond to a large number of locations.

Figure 11:
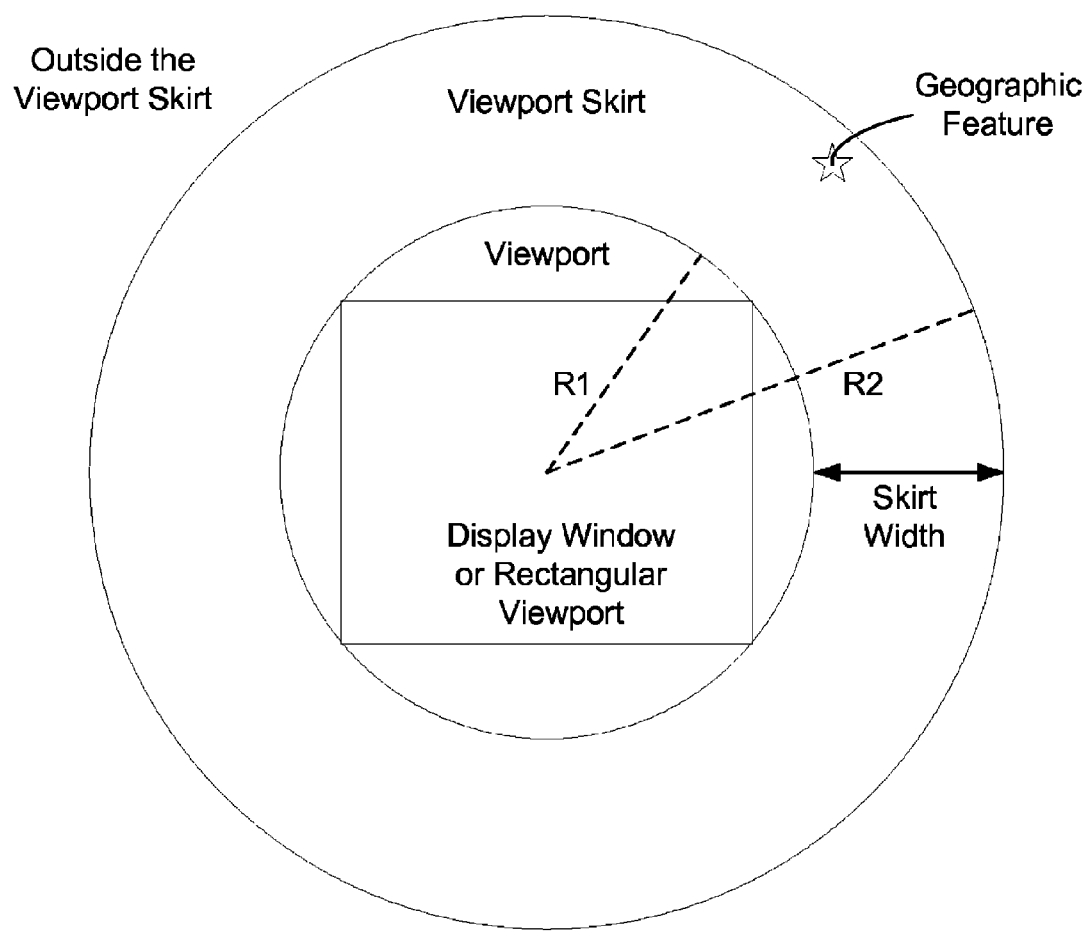
FIG. 11 depicts a set of geographic regions with respect to a current display window.

Referring to FIG. 11, in the following discussion, the "viewport" or "current viewport" corresponds to the geographic region currently displayed on the user's client device or system. For example, the viewport may be the display window produced (e.g., by an online mapping program or service) in response to the immediately preceding location search, or it may be a circular region that bounds the viewport rectangle displayed on the user's client system. Thus, the viewport can be rectangular or circular in shape. In the remainder of this discussion, the viewport is assumed to be circular in shape and to surround and include the viewport rectangle displayed on the user's client system. In addition, the viewport may result from user actions (e.g., pan and/or zoom commands or actions) that change the viewport to a user-specified region.

When a user submits a location query that results in more than one result, the results may be scored so as to favor results (i.e., locations) within the current viewport over locations outside the viewport, and to favor locations near the viewport (e.g., within a skirt region around the viewport, herein called the "viewport skirt region") than locations further away from the viewport. In one embodiment, the scoring function described above for scoring "documents" (sometimes called location description documents or location description database entries) is modified to include a score attenuation factor (SAF), which biases the score to favor results that intersect the current viewport, and to favor results that intersect a viewport skirt region that surrounds the viewport over results that intersect neither the viewport region nor the viewport skirt region (i.e., which are outside the viewport skirt region). In this context, the term "intersect" means that at least a portion of the geographic feature identified by a search result falls within a particular region.

Figure 12:
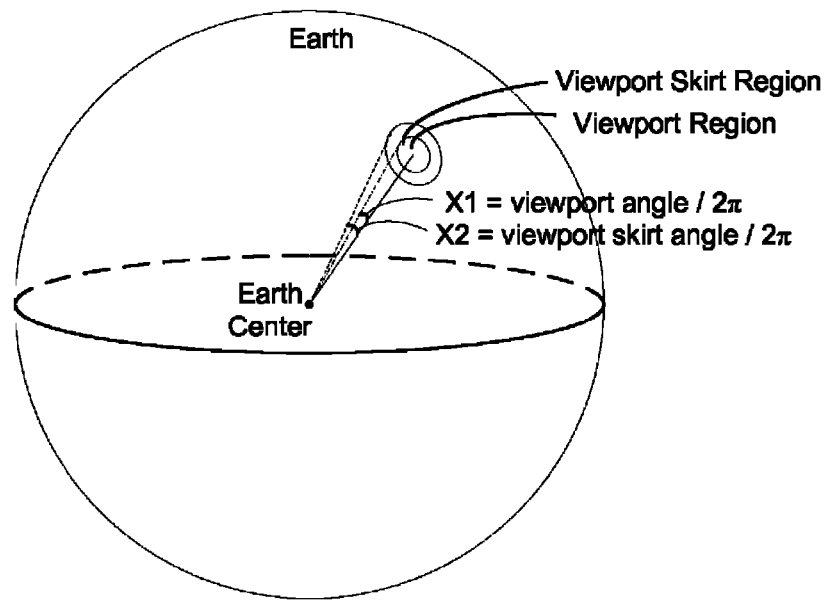
FIGS. 12 and 13 show how distances and regions on the surface of the Earth are measured as normalized angular distances, and also show how the location of a geographic feature in a viewport skirt region is converted into a ratio value.
Figure 13:
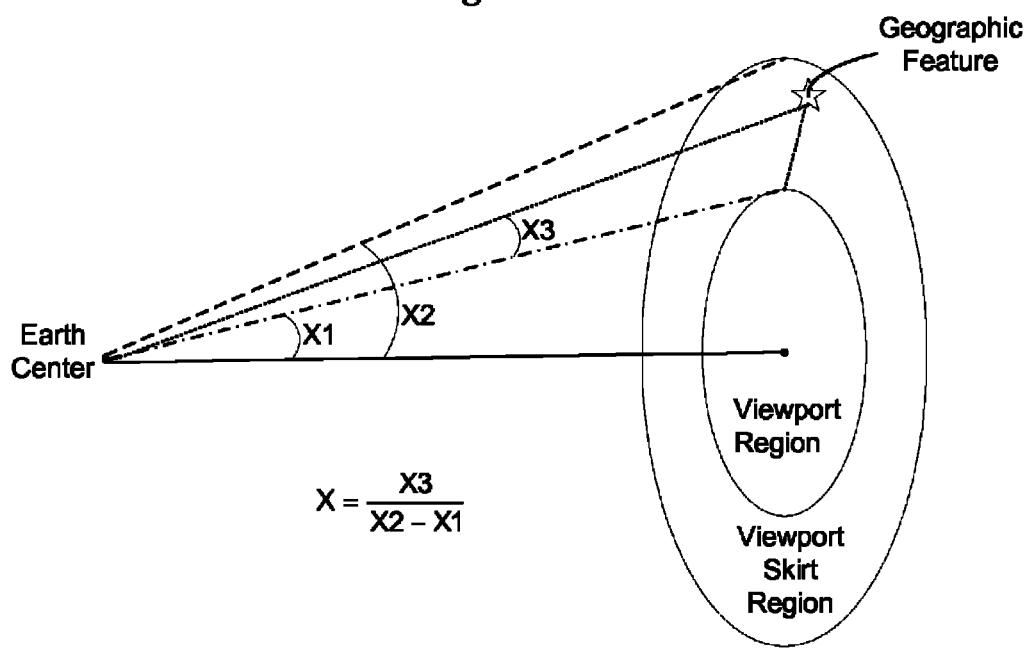
Figure 14:
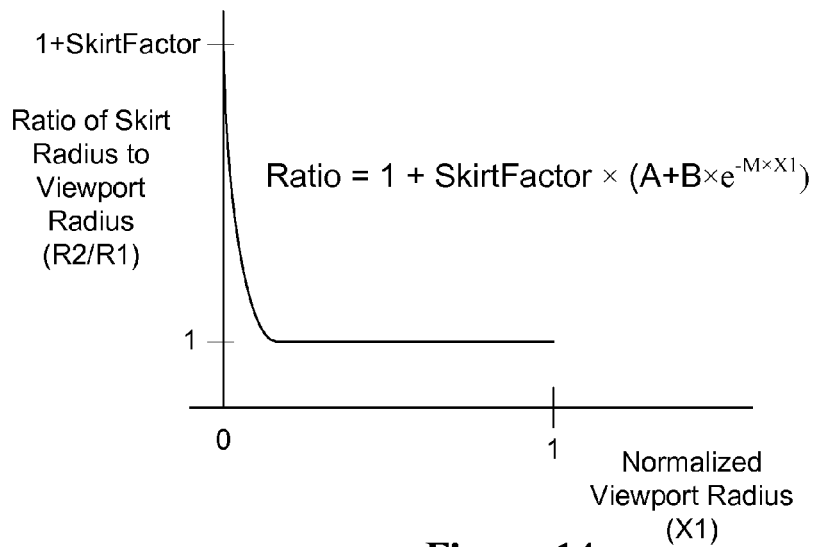
FIG. 14 depicts a graph of a function for determining the radius of a skirt region in accordance with the radius of a viewport region.
Figure 15:
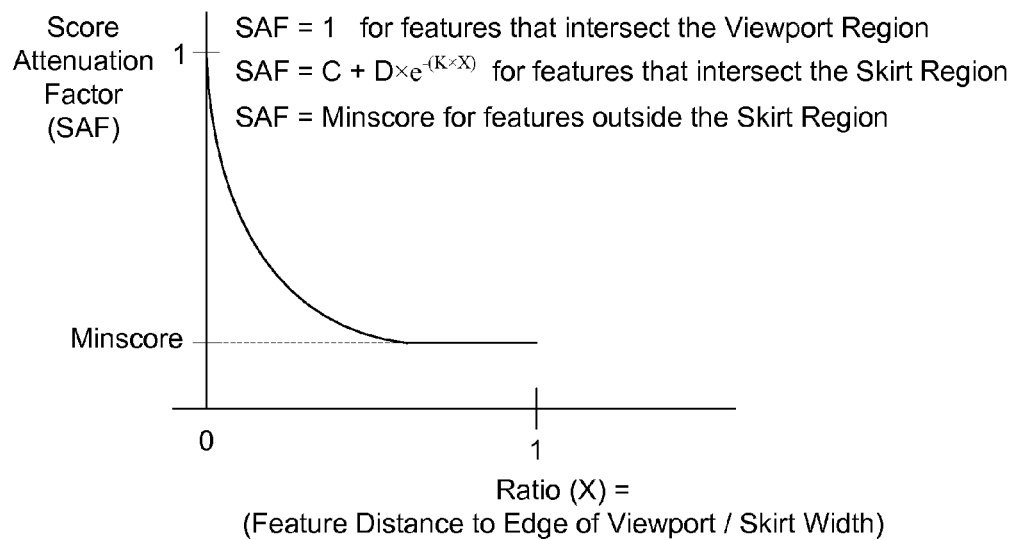
FIG. 15 depicts a graph of a function used to assign a score attenuation factor in accordance with the location of a geographic feature relative to a current viewport region and skirt region.

As shown in FIGS. 12 and 13, the sizes of regions and distances on the surface of the earth may be measured in terms of "angular distances", which is the angular size of the arc on the earth's surface that is subtended by those regions or distances. Angular distances may be measured in units of radians or degrees. Normalized angular distances are divided by a normalization factor, such as $2\pi$, so that the maximum angular distance is 1 (or any other predefined value) and the minimum angular distance is 0. In FIGS. 12 and 13, X1 represents the normalized size of the viewport region, based on the angular distance of the viewport region's radius R1. X2 is the normalized size of the viewport skirt region, based on the angular distance of the viewport skirt region's radius R2. X2−X1 represents the width of the viewport skirt region. X3 represents the normalized angular distance between a geographical feature and the closest edge of the viewport region, or more generally the distance between the geographical feature and the viewport region. X represents the ratio of (A) the distance between the geographical feature and the viewport region, and (B) the width of the viewport skirt region.

In one embodiment, the size of the viewport skirt region depends on the size of the viewport region. In particular, when the radius of the viewport region is small (e.g., less than a few kilometers), the radius of the viewport skirt region is as much as 1+SkirtFactor times as large as the radius of the viewport region, where SkirtFactor is a configurable parameter. When the radius of the viewport region is large (e.g., more than a few hundred kilometers), the radius of the viewport skirt region is approximately the same as the radius of the viewport region. In an exemplary embodiment, the radius of the viewport skirt region is defined as:

SkirtRegionRadius=ViewportRadius×(1+SkirtFactor× EV)

$EV = A + B \times e^{-M \times X1}$ where A and B are selected so that EV equals its maximum value, 1, when X1 is equal to zero (i.e., when the viewport region is very small), and EV equals its minimum value, 0, when X1 is equal to its maximum value, 1 (corresponding to a viewport region that covers the entire earth). SkirtFactor is a configurable scaling factor. An exemplary value of Skirt-Factor is 10; in other embodiments, SkirtFactor is equal to a value between 4 and 20. M is a configurable exponential rate factor. An exemplary value of M is 50; in other embodiments, M is equal to a value between 10 and 200. In addition, the value of M depends on the scaling of the angular distance X1. Solving for A and B in accordance with the constraints stated above, the equation for EV becomes:

$$EV = \frac{e^{-M}}{1-e^{-M}} - \frac{e^{-M \times X1}}{1-e^{-M}}.$$

When M=50, $e^{-M}$ is very close to zero ($e^{-50} \approx 1.9 \times 10^{-22}$), and EV is approximately equal to $e^{-M*X1}$.

In an exemplary embodiment, the scores may be determined in accordance with the following scoring function $$\text{Score} = \frac{1}{E}\left[\sum_i IR_i\right] \times FR \times SAF,$$

where $IR_i$ is a query match score (with respect to a particular candidate document) corresponding to a respective term or element "i" in the canonical and/or Boolean expression, FR is the "feature rank," which indicates the importance of the feature or location, E is a normalization value, and SAF is the scoring attenuation factor mentioned above. The IR, FR and E parameters are discussed in more detail above, and that discussion is equally applicable to the scoring function discussed here. It is noted that the sum of the $IR_i$ values for a particular candidate document (or geographical feature) can be considered to be an information retrieval score or query match score for the candidate, and that all the other parameters of the scoring function are for scaling, boosting or attenuating the score in accordance with additional factors so as to improve how the search results are ranked (i.e., so that the topmost ranked search results are the search results that are most likely to correspond to the geographical feature that is being sought by the user).

In an exemplary embodiment, the SAF for a particular geographic feature is determined in accordance with the following function $SAF = C + D \times e^{-K \times X}$ where K is an exponential scaling factor, and X is the ratio of (A) the distance between the geographical feature and the viewport region (i.e., the closest edge of the viewport region), and (B) the width of the viewport skirt region, as explained above with reference to FIG. 13. In the above equation, C and D are values that are selected so that SAF equals its minimum value, MinScore, when X is equal to 1 (i.e., when the geographical feature is in the outermost portion of the skirt region, and is equal to its maximum value, 1, when X is equal to zero (i.e., when the geographical feature intersects or is adjacent the line or boundary between the viewport region and the viewport skirt region). Solving for C and D in accordance with the constraints stated above, the equation for SAF becomes:

$$SAF = \frac{MinScore - e^{-K}}{1-e^{-K}} + \frac{(1-MinScore) \times e^{-K \times X}}{1-e^{-K}}.$$

When K=3, $e^{-K}$ is approximately equal to 0.5, and $1-e^{-K}$ is approximately equal to 0.95. When MinScore=0.2 and K=3, SAF is approximately equal to $0.158+0.842*e^{-3X}$ for geographic features that intersect the viewport skirt region (but do not intersect the viewport region). Note that SAF, according to this equation is equal to 1.0 when X=0, and is approximately equal to 0.2 when X=1. As noted above, SAF is equal to 1 for geographic features that intersect the viewport region, and is equal to MinScore (e.g., 0.2) for geographic features that intersect neither the viewport region nor the viewport skirt region. In other embodiments, MinScore is a value between 0.1 and 0.5, and K is a value between 2 and 10.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method for performing a location search, comprising:
   at a computer system including one or more processors and memory storing one or more programs, the one or more processors executing the one or more programs to perform the operations of:
   receiving a location search query;
   identifying geographical feature documents that satisfy the location search query, wherein each of the geographical feature documents correspond to a geographical feature; and
   ranking the identified geographical feature documents in accordance with a score that is based, at least in part, on proximity of the geographical features corresponding to the identified geographical feature documents to a geographical viewport region of a client system, to produce a set of ranked geographical feature documents; and providing results, in accordance with the ranked geographical feature documents, that identify at least one geographic feature corresponding to the at least one of the ranked geographical feature documents.

2. The method of claim 1, wherein the geographical viewport region corresponds to a geographical region displayed on the client system.

3. The method of claim 1, wherein the geographical viewport region corresponds to a geographical region displayed on the client system in response to a prior location search query.

4. The method of claim 1, wherein the geographical viewport region comprises a circular geographical region that encompasses a rectangular geographical region displayed on the client system.

5. The method of claim 4, where the geographical viewport region has a size corresponding to a size of the rectangular geographical region displayed on the client system.

6. The method of claim 1, including determining key words corresponding to the location search query, and identifying geographical feature documents that match the key words in the location search query;
wherein the determining of the key words includes removing punctuation marks and non-location terms from the location search query.

7. The method of claim 1, including determining key words corresponding to the location search query, and identifying geographical feature documents that match the key words in the location search query;
wherein the key words include one or more synonyms for one or more terms in the location search query.

8. The method of claim 1, including determining key words corresponding to the location search query, and identifying geographical feature documents that match the key words in the location search query;
wherein identifying the geographical feature documents includes determining a canonical expression corresponding to the key words.

9. The method of claim 1, wherein the geographical feature documents are in an index that includes a plurality of geographical feature documents that correspond to geographic features.

10. The method of claim 9, wherein the plurality of geographical feature documents include reference coordinates corresponding to the geographic features.

11. The method of claim 1, wherein the identifying of the geographical feature documents includes determining a score for each of the geographical feature documents.

12. The method of claim 11, wherein providing results includes providing a single geographical feature or location if a best score for a corresponding geographical feature document is greater than a pre-determined multiple of a next best score for a next geographical feature document in a top-N ranking of the geographical feature documents.

13. The method of claim 1, wherein the providing includes providing a map image corresponding to at least the one geographical feature.

14. A search engine system, comprising:
one or more central processing units to execute programs; memory; and
one or more programs stored in the memory and executed by the processor, the one or more programs including:
instructions for receiving a location search query;
instructions for identifying geographical feature documents that satisfy the location search query, wherein each of the geographical feature documents correspond to a geographical feature;
instructions for ranking the identified geographical feature documents in accordance with a score that is based, at least in part, on proximity of the geographical features corresponding to the identified geographical feature documents to a geographical viewport region of a client system, to produce a set of ranked geographical feature documents; and
instructions for providing results, in accordance with the ranked geographical feature documents, that identify at least one geographic feature corresponding to the at least one of the ranked geographical feature documents.

15. A computer-implemented method for performing a location search, comprising:
at a computer system including one or more processors and memory storing one or more programs, the one or more processors executing the one or more programs to perform the operations of:
receiving a location search query;
identifying geographical features that satisfy the location search query;
ranking the identified geographical features in accordance with a score that is based, at least in part, on proximity of the geographical features to a geographical viewport region of a client system, to produce a set of ranked geographical features; and
providing results, in accordance with the ranked geographical features, that identify at least one geographic feature corresponding to the at least one of the ranked geographical features.

16. The method of claim 15, wherein the geographical viewport region corresponds to a geographical region displayed on the client system.

17. The method of claim 15, wherein the geographical viewport region corresponds to a geographical region displayed on the client system in response to a prior location search query.

18. The method of claim 15, wherein the geographical viewport region comprises a circular geographical region that encompasses a rectangular geographical region displayed on the client system.

19. The method of claim 18, where the geographical viewport region has a size corresponding to a size of the rectangular geographical region displayed on the client system.

20. The method of claim 15, including:
determining key words corresponding to the location search query; and
identifying geographical features that match the key words in the location search query.

21. The method of claim 20, wherein the determining of the key words includes any removing punctuation marks and any non-location terms from the location search query.

22. The method of claim 20, wherein the key words include one or more synonyms for one or more terms in the location search query.

23. A search engine system, comprising:
one or more central processing units to execute programs; memory; and
one or more programs stored in the memory and executed by the processor, the one or more programs including:
instructions for receiving a location search query;
instructions for identifying geographical features that satisfy the location search query;
instructions for ranking the identified geographical features in accordance with a score that is based, at least in part, on proximity of the geographical features to a geographical viewport region of a client system, to produce a set of ranked geographical features; and
instructions for providing results, in accordance with the ranked geographical features, that identify at least one geographic feature corresponding to the at least one of the ranked geographical features.

* * * * *